United States Patent
Hwang et al.

(10) Patent No.: US 7,898,429 B2
(45) Date of Patent: Mar. 1, 2011

(54) ANGLE-ADJUSTABLE METHOD AND AUTOMATIC ANGLE-ADJUSTABLE DISPLAY DEVICE

(75) Inventors: Chwen-Tay Hwang, Hsinchu (TW); Chih-Hsin Chen, Hsinchu (TW); Yung-Liang Lee, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 275 days.

(21) Appl. No.: 12/178,418

(22) Filed: Jul. 23, 2008

(65) Prior Publication Data
US 2009/0201165 A1 Aug. 13, 2009

(30) Foreign Application Priority Data
Feb. 12, 2008 (TW) ................ 97104801 A (51) Int. Cl.
*G08B 31/00* (2006.01)
(52) U.S. Cl. .................... 340/686.1; 340/539.23; 345/158; 345/649; 348/135; 348/61; 348/806
(58) Field of Classification Search ............ 340/686.1, 340/539.23, 435; 345/158, 649; 348/148, 348/135, 61, 806, 42, 51, 55; 702/150, 94
See application file for complete search history.

(56) References Cited

U.S. PATENT DOCUMENTS

| | | | | |
|---|---|---|---|---|
| 5,250,888 A * | 10/1993 | Yu | ............. | 318/640 |
| 5,805,201 A * | 9/1998 | Fujiwara | ............. | 348/818 |
| 6,088,006 A * | 7/2000 | Tabata | ............. | 345/7 |
| 6,115,025 A * | 9/2000 | Buxton et al. | ............. | 345/659 |
| 6,176,782 B1 * | 1/2001 | Lyons et al. | ............. | 463/36 |
| 6,283,860 B1 * | 9/2001 | Lyons et al. | ............. | 463/36 |
| 6,311,141 B1 * | 10/2001 | Hazra | ............. | 702/150 |
| 6,348,928 B1 * | 2/2002 | Jeong | ............. | 345/649 |
| 6,496,218 B2 * | 12/2002 | Takigawa et al. | ............. | 348/42 |
| 6,592,223 B1 * | 7/2003 | Stern et al. | ............. | 351/239 |
| 6,931,596 B2 * | 8/2005 | Gutta et al. | ............. | 715/728 |
| 7,023,499 B2 * | 4/2006 | Williams et al. | ............. | 348/836 |
| 7,134,080 B2 * | 11/2006 | Kjeldsen et al. | ............. | 715/730 |
| 7,142,232 B2 * | 11/2006 | Kremen | ............. | 348/51 |

(Continued)

FOREIGN PATENT DOCUMENTS

TW 460759 10/2001

(Continued)

*Primary Examiner*—George A Bugg
*Assistant Examiner*—Hoi C Lau
(74) *Attorney, Agent, or Firm*—Kirton & McConkie; Evan R. Witt (57) ABSTRACT

An automatic angle-adjustable display device and an angle-adjustable method are provided. The automatic angle-adjustable display device includes a screen, three wireless transmitting and receiving sensors, an angle adjustment mechanism and a control unit. The wireless transmitting and receiving sensors are respectively disposed at first, second and third positions of the screen. In response to a control signal issued from the control unit, the angle adjustment mechanism is driven to adjust the viewing angle of the screen with respect to the viewer. The angle-adjustable method includes steps of triggering the wireless transmitting and receiving sensors to emit these wireless signals, measuring first, second and third distances between the first, second and third positions of the screen and the viewer according to the reflected wireless signals, and adjusting the viewing angle of the screen with respect to the viewer according to these distance differences.

18 Claims, 10 Drawing Sheets

U.S. PATENT DOCUMENTS

| | | | | |
|---|---|---|---|---|
| 7,530,019 | B2* | 5/2009 | Kjeldsen et al. | 715/730 |
| 7,630,193 | B2* | 12/2009 | Ledbetter et al. | 361/679.21 |
| 7,648,443 | B2* | 1/2010 | Schenk | 482/3 |
| 7,659,921 | B2* | 2/2010 | Aoyama | 348/135 |
| 7,684,613 | B2* | 3/2010 | Harada et al. | 382/154 |
| 2002/0047893 | A1* | 4/2002 | Kremen | 348/40 |
| 2002/0175896 | A1* | 11/2002 | Vaananen et al. | 345/158 |
| 2003/0048354 | A1* | 3/2003 | Takemoto et al. | 348/51 |
| 2003/0206653 | A1* | 11/2003 | Katayama et al. | 382/154 |
| 2004/0189947 | A1* | 9/2004 | Hattori et al. | 353/13 |
| 2005/0046626 | A1* | 3/2005 | Yoda et al. | 345/419 |
| 2005/0053274 | A1* | 3/2005 | Mayer et al. | 382/154 |
| 2006/0139447 | A1* | 6/2006 | Unkrich | 348/51 |
| 2006/0170674 | A1* | 8/2006 | Tsubaki et al. | 345/419 |
| 2006/0192660 | A1* | 8/2006 | Watanabe et al. | 340/435 |
| 2006/0203014 | A1* | 9/2006 | Lev et al. | 345/659 |
| 2006/0227419 | A1* | 10/2006 | Cha et al. | 359/465 |
| 2006/0279552 | A1* | 12/2006 | Tonouchi | 345/173 |
| 2007/0013716 | A1* | 1/2007 | Kjeldsen et al. | 345/594 |
| 2007/0058329 | A1* | 3/2007 | Ledbetter et al. | 361/681 |
| 2007/0222775 | A1* | 9/2007 | Hamagishi | 345/204 |
| 2007/0291172 | A1* | 12/2007 | Kouzimoto et al. | 348/488 |
| 2008/0024649 | A1* | 1/2008 | Okawara | 348/347 |
| 2008/0049020 | A1* | 2/2008 | Gusler et al. | 345/427 |
| 2008/0165195 | A1* | 7/2008 | Rosenberg | 345/473 |
| 2009/0058845 | A1* | 3/2009 | Fukuda et al. | 345/214 |
| 2009/0058878 | A1* | 3/2009 | Sasagawa | 345/593 |
| 2009/0167737 | A1* | 7/2009 | Chen et al. | 345/207 |
| 2009/0174658 | A1* | 7/2009 | Blatchley et al. | 345/158 |
| 2009/0201165 | A1* | 8/2009 | Hwang et al. | 340/686.1 |

FOREIGN PATENT DOCUMENTS

| | | |
|---|---|---|
| TW | 225752 | 12/2004 |
| TW | 252466 | 4/2006 |
| TW | 307922 | 3/2007 |

* cited by examiner

ANGLE-ADJUSTABLE METHOD AND AUTOMATIC ANGLE-ADJUSTABLE DISPLAY DEVICE

FIELD OF THE INVENTION

The present invention relates to an angle-adjustable method and an automatic angle-adjustable display device, and more particularly to an angle-adjustable method and an automatic angle-adjustable display device for automatically adjusting the viewing angle of the screen by detecting the viewer's position.

BACKGROUND OF THE INVENTION

Figure 1A:
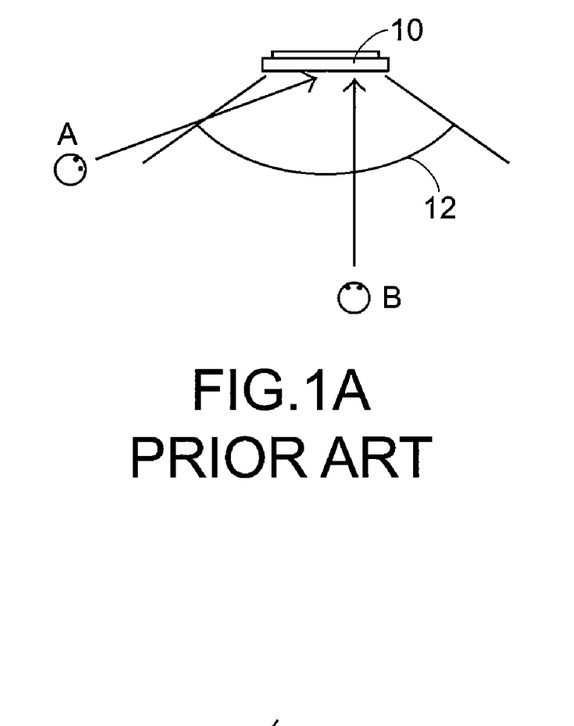
FIG. 1A is a schematic top view of the conventional LCD device.
Figure 1B:
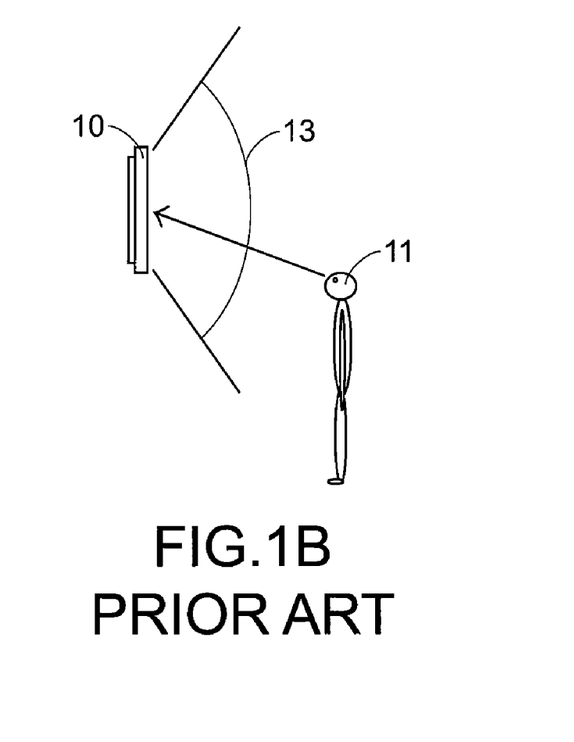
FIG. 1B is a schematic side view of the conventional LCD device.

FIG. 1A and FIG. 1B schematically illustrate the viewing angle of a conventional liquid crystal display (LCD) device. Referring to FIG. 1A, a schematic top view of the conventional LCD device is shown. The conventional LCD device 10 has a fixed orientation and thus the images are easily distorted when the viewer is located at certain angles with respect to the conventional LCD device 10. For example, when a viewer is located at the position A as shown in FIG. 1A, the images on the screen of the conventional LCD device 10 are distorted and obscured because the viewer is beyond the range of a preferable horizontal viewing angle for the conventional LCD device 10. Whereas, when the viewer is located at the position B, which is directly in front of the conventional LCD device 10, the images on the screen of the conventional LCD device 10 are viewed without distortion. Referring to FIG. 1B, a schematic side view of the conventional LCD device is shown. Likewise, the conventional LCD device 10 is placed at a fixed orientation and a certain height. For viewing images on the conventional LCD device 10 without distortion, the viewer 11 needs to stand within the range of the vertical viewing angle for the conventional LCD device 10.

If other viewing positions are required when the viewer is not directly in front of the LCD device for example, the viewer must manually rotate the LCD device in order to see images on the screen of the LCD device without distortion. In addition, the viewing position should be further fine tuned in order to precisely position the LCD device. The process of manually rotating and tuning the LCD device is not user-friendly. This drawback becomes more serious if the process of manually rotating and tuning the LCD device is frequently done. For solving the above problems, some techniques have been developed.

Figure 2:
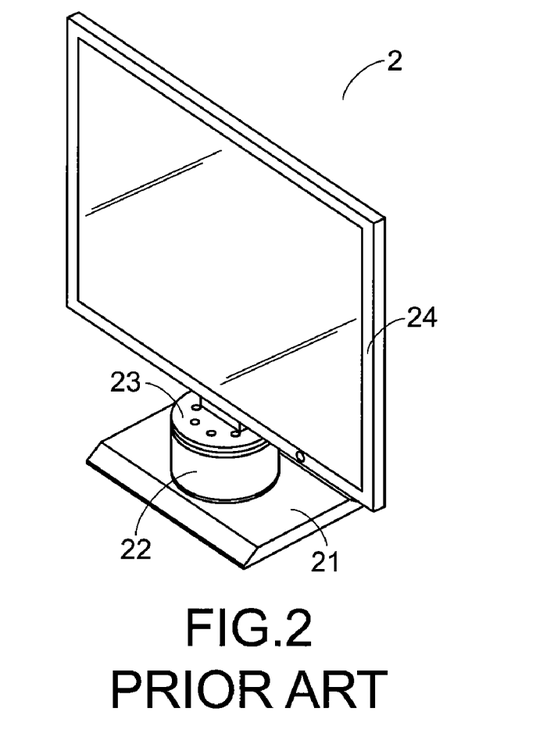
FIG. 2 is a schematic perspective view of a display device described in Taiwanese Patent M307922.

Please refer to FIG. 2, which is a schematic perspective view illustrating a display device described in Taiwanese Patent M307922. The display device 2 includes a base 21, a driving member 22, a screen 24 and a rotatable member 23. For rotating the screen 24 at a specified rotating angle, the viewer needs to input an instruction of setting desired rotating angle in a user operation interface of a remote controller (not shown) or the screen 24. By wirelessly or manually executing the instruction, the screen 24 issues an enable signal to the driving member 22. In response to the enable signal, a motor of the driving member 22 is driven to rotate the rotatable member 23 at the specified rotating angle. As the rotatable member 23 is rotated, the screen 24 coupled to the rotatable member 23 will be also rotated at the specified rotating angle. Since the execution of the instruction of setting the rotating angle is wirelessly controlled or manually operated, the process of rotating the screen is still not user-friendly. U.S. Pat. Nos. 5,250,888 and 6,115,025, which disclose methods of manually or wirelessly (e.g. by a remote controller) changing the rotating directions of the display device, have similar problems.

Figure 3:
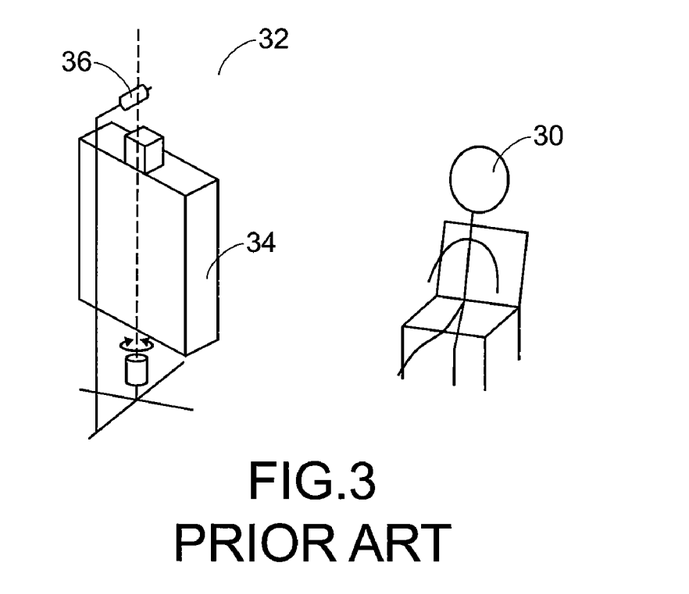
FIG. 3 is a schematic perspective view of a display device described in American U.S. Pat. No. 6,931,596.

Another approach is disclosed in for example U.S. Pat. Nos. 6,311,141 and 6,931,596. FIG. 3 is a schematic perspective view illustrating a display device for automatic adjustment of the orientation of a screen. The images of a viewer's face 30 are captured by a camera 36 of the display device 32. An image recognition algorithm may be used to recognize the contours of the viewer's face 30, thereby analyzing the position coordinates (x, y, z) of the viewer with respect to the display device 32. The orientation of the screen 34 is adjusted according to the position of the viewer. Since this display device uses the camera 36 to capture images and the means of analyzing images needs many procedures and complicated computations, corresponding hardware components used in these literatures are not cost-effective.

Therefore, there is a need of providing an improved device and a method to obviate the drawbacks encountered from the prior art.

SUMMARY OF THE INVENTION

In accordance with an aspect of the present invention, an automatic angle-adjustable display device for showing images to be viewed by a viewer is provided. The automatic angle-adjustable display device includes a screen, a first wireless transmitting and receiving sensor, a second wireless transmitting and receiving sensor, an angle adjustment mechanism and a control unit. The screen is used for showing the images thereon. The first wireless transmitting and receiving sensor is located at a first position of the screen for emitting a first wireless signal and receiving the first wireless signal reflected from the viewer. The second wireless transmitting and receiving sensor is located at a second position of the screen for emitting a second wireless signal and receiving the second wireless signal reflected from the viewer. The angle adjustment mechanism is connected to the screen for adjusting a viewing angle of the screen with respect to the viewer in response to a control signal. The control unit is communicated with the first wireless transmitting and receiving sensor, the second wireless transmitting and receiving sensor and the angle adjustment mechanism. The control unit triggers the first and second wireless transmitting and receiving sensors to respectively emit the first and second wireless signals. According to the reflected first and second wireless signals, the control unit calculates a first distance between the first position of the screen and the viewer and a second distance between the second position of the screen and the viewer. By calculating a first distance difference between the first distance and the second distance, the control signal is generated according to the first distance difference. In response to the control signal, the angle adjustment mechanism is driven to adjust the viewing angle of the screen with respect to the viewer such that the first distance difference lies within a first predetermined range.

In an embodiment, the automatic angle-adjustable display device further includes a third wireless transmitting and receiving sensor located at a third position of the screen for emitting a third wireless signal and receiving the third wireless signal reflected from the viewer. The control unit is further communicated with the third wireless transmitting and receiving sensor for triggering the third wireless transmitting and receiving sensor to emit the third wireless signal. According to the reflected third wireless signal, the control unit calculates a third distance between the third position of the screen and the viewer. By calculating a second distance difference between the third distance and the first distance and a third distance difference between the third distance and the second distance, the control signal is generated according to the second and third distance differences. In response to the control signal, the angle adjustment mechanism is driven to adjust the viewing angle of the screen with respect to the viewer such that the second and third distance differences lie within a second predetermined range.

In accordance with another aspect of the present invention, an angle-adjustable method for use with a screen of a display device is provided. The angle-adjustable method includes steps of measuring a first distance between a first position of the screen and a viewer, measuring a second distance between a second position of the screen and the viewer, and calculating a first distance difference between the first distance and the second distance, and adjusting the viewing angle of the screen with respect to the viewer according to the first distance difference, so that the first distance difference lies within a first predetermined range.

In an embodiment, the angle-adjustable method further includes steps of measuring a third distance between a third position of the screen and a viewer, and calculating a second distance difference between the third distance and the first distance and a third distance difference between the third distance and the second distance, and adjusting the viewing angle of the screen with respect to the viewer according to the second and third distance differences, so that the second and third distance differences lie within a second predetermined range.

The automatic angle-adjustable display device of the embodiment of the present invention automatically monitors the viewer's position by detecting the wireless signals emitted from the wireless transmitting and receiving sensors and reflected from the viewer. According to the wireless signals, the angle of the screen is automatically adjusted and thus desired viewing angle of the screen with respect to the viewer is achieved. Under this circumstance, the images on the screen are viewed without distortion.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be located in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 4:
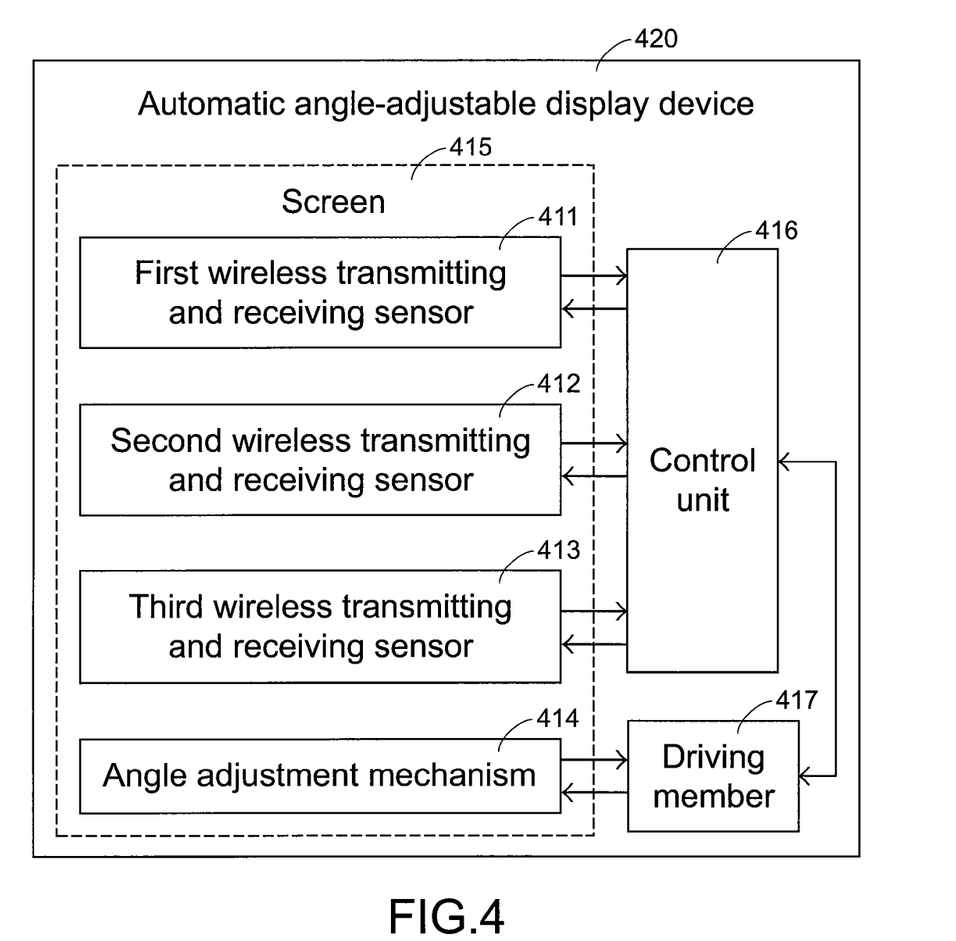
FIG. 4 is a schematic functional block diagram illustrating an automatic angle-adjustable display device according to a preferred embodiment of the present invention.

FIG. 4 is a schematic functional block diagram illustrating an automatic angle-adjustable display device according to a preferred embodiment of the present invention. As shown in FIG. 4, the automatic angle-adjustable display device 420 principally includes a screen 415, a first wireless transmitting and receiving sensor 411, a second wireless transmitting and receiving sensor 412, a third wireless transmitting and receiving sensor 413, a driving member 417, an angle adjustment mechanism 414 and a control unit 416. An example of the screen 415 includes but is not limited to a liquid crystal display screen or a plasma display screen. The first wireless transmitting and receiving sensor 411 is located at a first position of the screen 415. The second wireless transmitting and receiving sensor 412 is located at a second position of the screen 415. The third wireless transmitting and receiving sensor 413 is located at a third position of the screen 415. The control unit 416 is a main component for signal processing and data computation. An example of the control unit 416 includes but is not limited to a microprocessor or a microcontroller.

In the automatic angle-adjustable display device 420, the control unit 416 is communicated with the first wireless transmitting and receiving sensor 411, the second wireless transmitting and receiving sensor 412, the third wireless transmitting and receiving sensor 413, the driving member 417 and the angle adjustment mechanism 414. The first wireless transmitting and receiving sensor 411, the second wireless transmitting and receiving sensor 412 and the third wireless transmitting and receiving sensor 413 are periodically triggered by the control unit 416, thereby emitting the first, second and third wireless signals, respectively. The control unit 416 discriminates whether a viewer is located within the sensing ranges of the first, second and third wireless transmitting and receiving sensors. When the viewer is located within the sensing ranges of the wireless transmitting and receiving sensors 411, 412 and 413, the reflected wireless signals will be respectively received by the wireless transmitting and receiving sensors 411, 412 and 413 and thus corresponding notification signals are issued to the control unit 416. After the control unit 416 receives the notification signals from the wireless transmitting and receiving sensors 411, 412 and 413, the control unit 416 triggers the first wireless transmitting and receiving sensor 411 to issue the first wireless signal at a first time spot, triggers the second wireless transmitting and receiving sensor 412 to issue the second wireless signal at a second time spot, and triggers the third wireless transmitting and receiving sensor 413 to issue the third wireless signal at a third time spot. At a fourth time spot, the first wireless signal reflected by the viewer is received by the first wireless transmitting and receiving sensor 411. At a fifth time spot, the second wireless signal reflected from the viewer is received by the second wireless transmitting and receiving sensor 412. At a sixth time spot, the third wireless signal reflected from the viewer is received by the third wireless transmitting and receiving sensor 413. The first, second and third wireless signals reflected from the viewer and respectively received by the wireless transmitting and receiving sensors 411, 412 and 413 are amplified and filtered, and then transmitted to the control unit 416. In this embodiment, the sequences of the fourth, fifth and sixth time spots are arbitrary as required. According to these time spots, the time intervals of the wireless signals traveling from corresponding wireless transmitting and receiving sensors and being reflected by the viewer to reach back the corresponding wireless transmitting and receiving sensors are estimated. These time intervals are converted into corresponding distances according to proper computation. That is, a first distance W1 between the viewer and the first position of the screen 415 is calculated according to the first time spot and the fourth time spot. Similarly, a second distance W2 between the viewer and the second position of the screen 415 is calculated according to the second time spot and the fifth time spot, and a third distance W3 between the viewer and the third position of the screen 415 is calculated according to the third time spot and the sixth time spot.

In this context, the difference between the first distance and the second distance is defined as a first distance difference; the difference between the third distance and the first distance is defined as a second distance difference; and the difference between the third distance and the second distance is defined as a third distance difference. In a case that these distance differences are not within respective predetermined ranges, corresponding horizontal and vertical control signals are issued by the control unit 416. In response to the control signals, the driving member 417 drives the angle adjustment mechanism 414 to adjust horizontal and vertical rotation angles of the screen 415 with respect to the viewer until these distance differences lie within the predetermined ranges. The first, second and third distance differences are expressed as absolute values or proportions. After a desired viewing angle of the screen 415 with respect to the viewer is adjusted by the angle adjustment mechanism 414, the angle adjustment mechanism 414 sends a positioning signal back to the control unit 416 through the driving member 417. The positioning signal indicates the current position of the screen 415 so as to inform the control unit 416 about the position of the screen 415 after horizontal and vertical rotation. According to the positioning signal, the screen 415 may be returned to a predetermined position if no viewer is located within the sensing ranges of the first, second and third wireless transmitting and receiving sensors 411, 412 and 413.

Figure 5A:
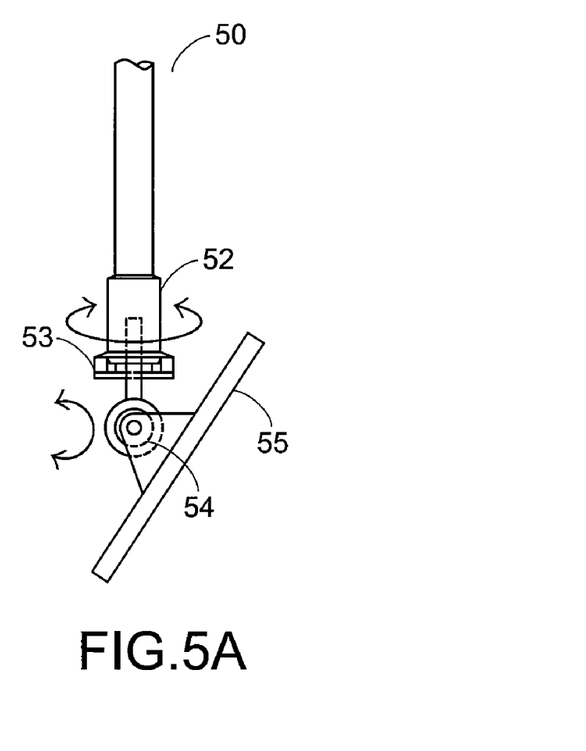
FIGS. 5A and 5B schematically illustrate two exemplary angle adjustment mechanisms (are suspended and wall-hung types respectively) of an automatic angle-adjustable display device according to a preferred embodiment of the present invention.
Figure 5B:
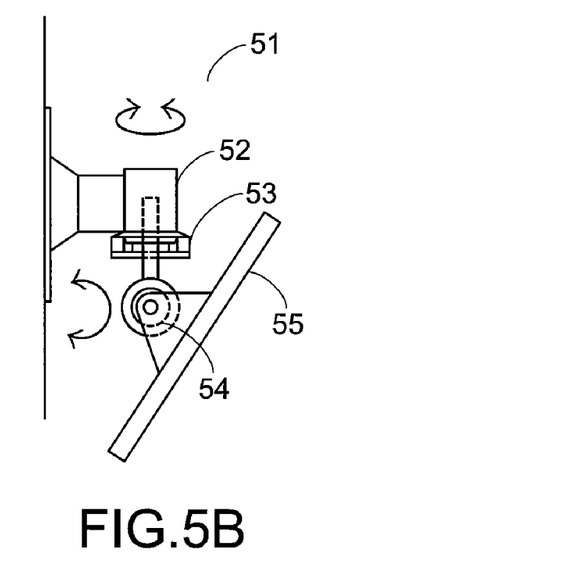

FIGS. 5A and 5B schematically illustrate two exemplary angle adjustment mechanisms of an automatic angle-adjustable display device according to a preferred embodiment of the present invention. The angle adjustment mechanisms 50 as shown in FIG. 5A and the angle adjustment mechanisms 51 as shown in FIG. 5B are suspended and wall-hung types, respectively. The rotation principles of these two angle adjustment mechanisms are substantially identical. Each of the angle adjustment mechanisms 50 and 51 includes a horizontal rotation servo motor 52, a suspended member 53 and a vertical rotation servo motor 54. In response to the horizontal control signal, the horizontal rotation servo motor 52 drives horizontal rotation of the suspended member 53 linked to the horizontal rotation servo motor 52, thereby adjusting the rotating angle of the screen 55 in the horizontal direction. In response to the vertical control signal, the vertical rotation servo motor 54 which is linked between the suspended member 53 and the screen 55 drives vertical rotation of the screen 55, thereby adjusting the rotating angle of the screen 55 in the vertical direction.

Figure 6A:
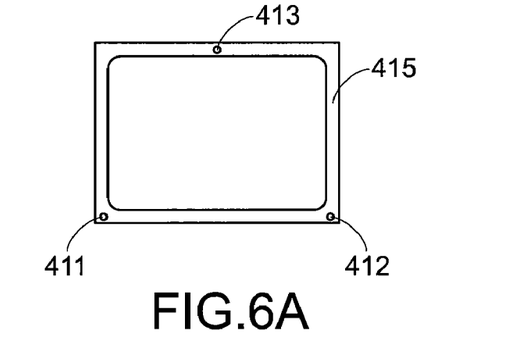
FIG. 6A is a schematic view illustrating positions of the wireless transmitting and receiving sensors within the screen.

Hereinafter, an embodiment of operating the automatic angle-adjustable display device is illustrated with reference to FIGS. 6A, 6B and 6C. FIG. 6A is a schematic view illustrating positions of the wireless transmitting and receiving sensors within the screen. The three wireless transmitting and receiving sensors 411, 412 and 413 are located inside the screen 415. The third wireless transmitting and receiving sensor 413 is located at the middle of the upper edge (e.g. the third position) of the screen 415. The first wireless transmitting and receiving sensor 411 is located at the left lower corner (i.e. the first position) of the screen 415. The second wireless transmitting and receiving sensor 412 is located at the right lower corner (i.e. the second position) of the screen 415. It is preferred that the first wireless transmitting and receiving sensor 411 and the second wireless transmitting and receiving sensor 412 are symmetrical with respect to the third wireless transmitting and receiving sensor 413. When a viewer is located within the sensing ranges of the first wireless transmitting and receiving sensor 411 at the first position and the second wireless transmitting and receiving sensor 412 at the second position, the wireless transmitting and receiving sensors 411 and 412 issue wireless signals as horizontal rotation reference indexes of the screen 415. When a viewer is located within the sensing ranges of the first wireless transmitting and receiving sensor 411 at the first position, the second wireless transmitting and receiving sensor 412 at the second position and the third wireless transmitting and receiving sensor 413 at the third position, the wireless transmitting and receiving sensors 411, 412 and 413 issue wireless signals as vertical rotation reference indexes of the screen 415. The first wireless transmitting and receiving sensor 411, the second wireless transmitting and receiving sensor 412 and the third wireless transmitting and receiving sensor 413 are periodically triggered by the control unit 416, thereby emitting first, second and third wireless signals, respectively. The control unit 416 discriminates whether a viewer is located within the sensing ranges of the first, second and third wireless transmitting and receiving sensors. Alternatively, the viewer may remotely or manually control on/off statuses of the wireless transmitting and receiving sensors 411, 412 and 413. When a viewer is located within the sensing ranges of the wireless transmitting and receiving sensors 411, 412 and 413, the reflected wireless signals are respectively received by the wireless transmitting and receiving sensors 411, 412 and 413 and thus issue corresponding notification signals to the control unit 416.

Figure 6B:
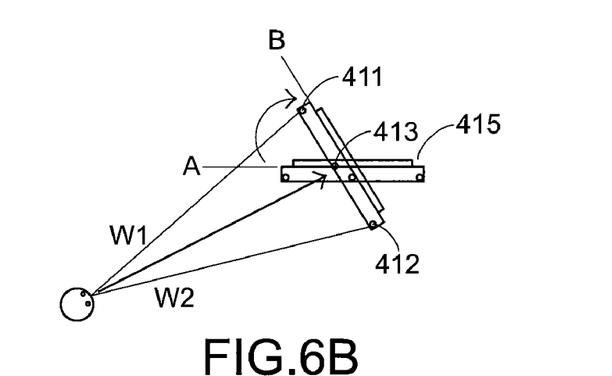
FIG. 6B is a schematic top view of the automatic angle-adjustable display device.

FIG. 6B is a schematic top view of the automatic angle-adjustable display device. After the control unit 416 receives the notification signals from the wireless transmitting and receiving sensors 411 and 412, the control unit 416 triggers the first wireless transmitting and receiving sensor 411 to issue the first wireless signal at a first time spot, and triggers the second wireless transmitting and receiving sensor 412 to issue the second wireless signal at a second time spot. At a fourth time spot detected by the control unit 416, the first wireless signal reflected by the viewer is received by the first wireless transmitting and receiving sensor 411. At a fifth time spot detected by the control unit 416, the second wireless signal reflected from the viewer is received by the second wireless transmitting and receiving sensor 412. Next, the control unit 416 calculates a first distance W1 between the viewer and the first position of the screen 415 according to the first time spot and the fourth time spot, and calculates a second distance W2 between the viewer and the second position of the screen 415 according to the second time spot and the fifth time spot. Next, the control unit 416 calculates a first distance difference between the first distance W1 and the second distance W2. In this embodiment, the first distance difference between the first distance W1 and the second distance W2 is expressed as an absolute value. If the first distance difference is greater than or equal to a first predetermined range D1, i.e. $|W1-W2| \geq D1$, a horizontal control signal is issued by the control unit 416. In response to the horizontal control signal, the driving member 417 drives the angle adjustment mechanism 414 to adjust the screen 415 from the A status to the B status. If W1<W2, the screen 415 is rotated in the clockwise direction and thus moved toward the smaller distance W1. Whereas, if W1>W2, the screen 415 is rotated in the anti-clockwise direction and thus moved toward the smaller distance W2.

Figure 6C:
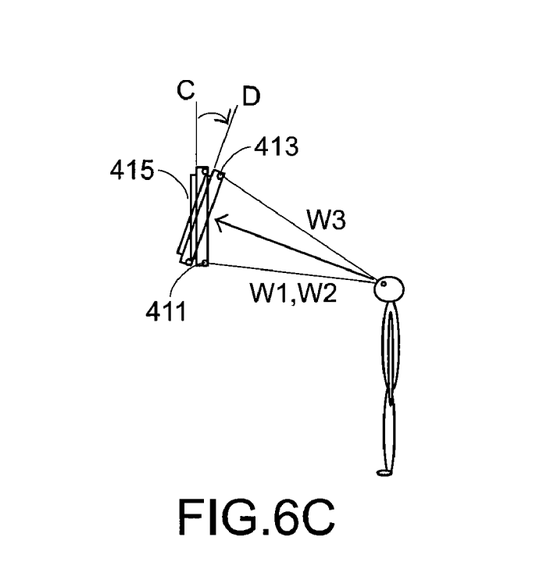
FIG. 6C is a schematic side view of the automatic angle-adjustable display device.

FIG. 6C is a schematic side view of the automatic angle-adjustable display device. The screen 415 is rotated in the horizontal direction until the first distance difference is within the first predetermined range D1, i.e. $|W1-W2| \leq D1$. Next, the control unit 416 triggers the third wireless transmitting and receiving sensor 413 to issue the third wireless signal at a third time spot. At a sixth time spot detected by the control unit 416, the third wireless signal reflected by the viewer is received by the third wireless transmitting and receiving sensor 413. Next, the control unit 416 calculates a third distance W3 between the viewer and the third position of the screen 415 according to the third time spot and the sixth time spot. Next, the control unit 416 calculates a second distance difference between the third distance W3 and the first distance W1 and a third distance difference between the third distance W3 and the second distance W2. If the second distance difference and the third distance difference are greater than or equal to a second predetermined range D2, i.e. $|W3-W1| \geq D2$ and $|W3-W2| \geq D2$, a vertical control signal is issued by the control unit 416. In response to the vertical control signal, the driving member 417 drives the angle adjustment mechanism 414 to adjust the screen 415 from the C status to the D status. If $|W3-W1| \geq D2$ and W1, W2<W3, the screen 415 is rotated in the downward direction and thus moved toward the smaller distance W1, W2. Whereas, if $|W3-W1| \geq D2$ and W1, W2>W3, the screen 415 is rotated in the upward direction and thus moved toward the smaller distance W3.

As previously described, the first, second and third wireless signals are issued from the wireless transmitting and receiving sensors 411, 412 and 413 within the screen 415, reflected by a viewer in the vicinity of the screen 415, and respectively received by the wireless transmitting and receiving sensors 411, 412 and 413. According to these time spots, the time intervals of the wireless signals traveling from corresponding wireless transmitting and receiving sensors and being reflected by the viewer to reach back the corresponding wireless transmitting and receiving sensors are measured. These time intervals are converted into corresponding distances W1, W2 and W3 according to proper computation by the control unit 416. Next, the control unit 416 calculates a first distance difference between the first distance W1 and the second distance W2, a second distance difference between the third distance W3 and the first distance W1, and a third distance difference between the third distance W3 and the second distance W2. If these distance differences are not within respective predetermined ranges, corresponding horizontal and vertical control signals are issued by the control unit 416. In response to the control signals, the driving member 417 drives the angle adjustment mechanism 414 to adjust horizontal and vertical rotation angles of the screen 415 with respect to the viewer until these distance differences lie within the predetermined ranges. The above technology will be illustrated in more details as follows.

Figure 7:
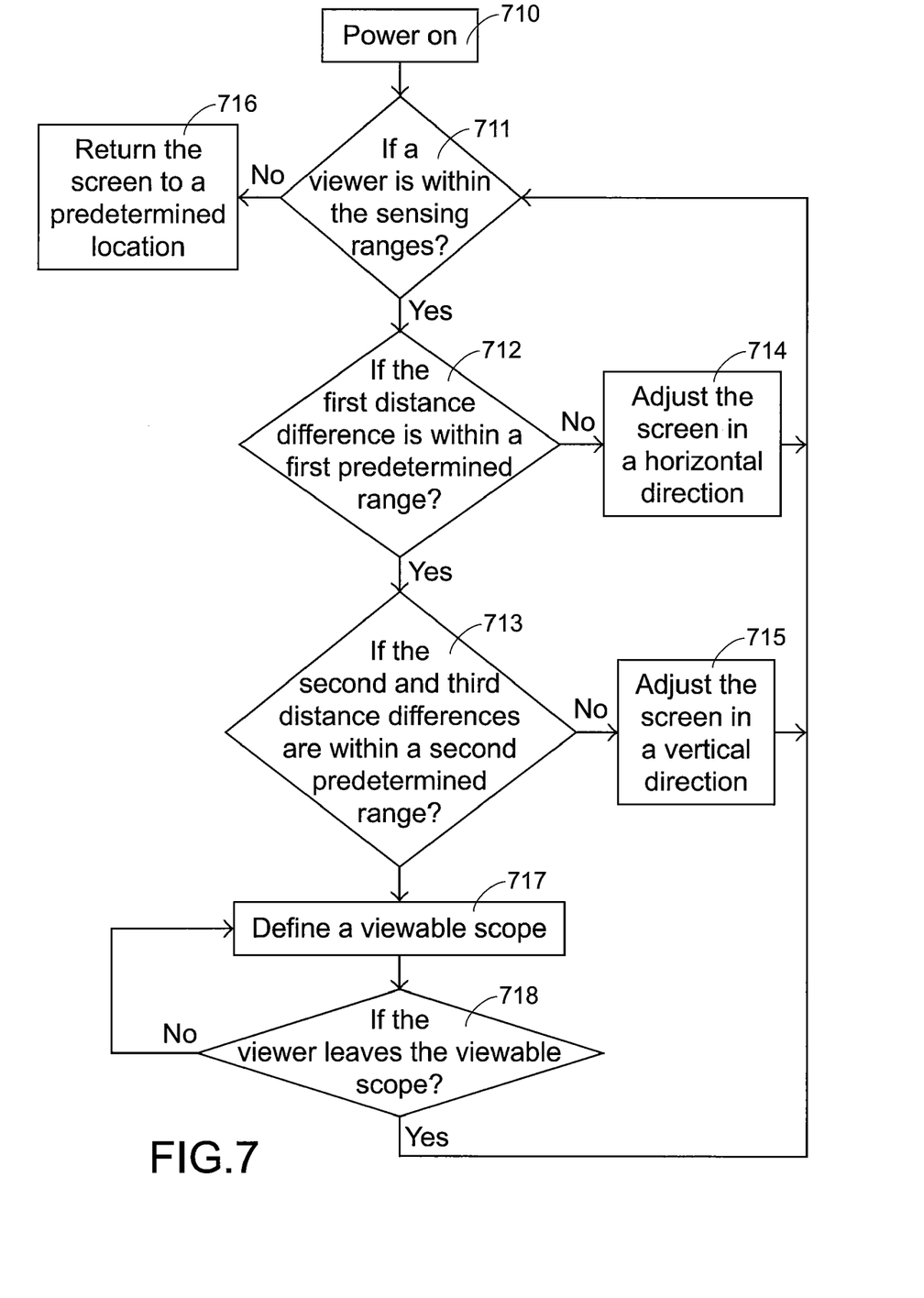
FIG. 7 is a flowchart illustrating a process of operating the automatic angle-adjustable display device according to the present invention.

FIG. 7 is a flowchart illustrating a process of operating the automatic angle-adjustable display device according to the present invention. First of all, the automatic angle-adjustable display device is powered on by remote or manual control (Step 710). Then, the control unit 416 discriminates whether a viewer is located within the sensing ranges of the first wireless transmitting and receiving sensor 411 and the second wireless transmitting and receiving sensor 412. Meanwhile, the control unit 416 triggers the first wireless transmitting and receiving sensor 411 to issue the first wireless signal at a first time spot, and triggers the second wireless transmitting and receiving sensor 412 to issue the second wireless signal at a second time spot. At a fourth time spot and a fifth time spot, the first and second wireless signals reflected by the viewer are respectively received by the wireless transmitting and receiving sensors 411 and 412. Next, the control unit 416 discriminates whether a viewer is located within the sensing ranges of the wireless transmitting and receiving sensors 411 and 412 (Step 711). If no reflected wireless signals are received, it is meant that no viewer is located within the sensing ranges. Meanwhile, the driving member 417 drives the angle adjustment mechanism 414 to return the screen 415 to a predetermined position in response to horizontal and vertical control signals issued by the control unit 416 (Step 716).

On the other hand, if a viewer is located within the sensing ranges, the first and second wireless signals are reflected by the viewer and respectively received by the wireless transmitting and receiving sensors 411 and 412. Meanwhile, the wireless transmitting and receiving sensors 411 and 412 issue corresponding notification signals to the control unit 416. At a fourth time spot and a fifth time spot detected by the control unit 416, the first and second wireless signals reflected by the viewer are respectively received by the wireless transmitting and receiving sensors 411 and 412. Next, the control unit 416 calculates a first distance W1 between the viewer and the first position of the screen 415 according to the first time spot and the fourth time spot, and calculates a second distance W2 between the viewer and the second position of the screen 415 according to the second time spot and the fifth time spot. Next, the control unit 416 discriminates whether a first distance difference between the first distance W1 and the second distance W2 is within a first predetermined range D1 (Step 712). If the first distance difference is beyond the first predetermined range D1, a horizontal control signal is issued by the control unit 416. In response to the horizontal control signal, the driving member 417 drives the angle adjustment mechanism 414 to adjust the screen 415 in a horizontal direction (Step 714).

Until the control unit 416 discriminates that the first distance difference is within the first predetermined range D1, the control unit 416 triggers the third wireless transmitting and receiving sensor 413 to issue the third wireless signal at a third time spot. At a sixth time spot detected by the control unit 416, the third wireless signal reflected by the viewer is received by the third wireless transmitting and receiving sensor 413. Next, the control unit 416 calculates a third distance W3 between the viewer and the third position of the screen 415 according to the third time spot and the sixth time spot. Next, the control unit 416 calculates a second distance difference between the third distance W3 and the first distance W1, and a third distance difference between the third distance W3 and the second distance W2. Next, the control unit 416 discriminates whether the second distance difference and the third distance difference are within a second predetermined range D2 (Step 713). If the second distance difference and the third distance difference are beyond the second predetermined range D2, a vertical control signal is issued by the control unit 416. In response to the vertical control signal, the driving member 417 drives the angle adjustment mechanism 414 to adjust the screen 415 in a vertical direction (Step 715).

After the control unit 416 discriminates that the second distance difference and the third distance difference are within the second predetermined range D2, a viewable scope is defined (Step 717). When the viewer is moved within the viewable scope, the automatic angle-adjustable display device needs not to perform the above angle adjusting procedures. Whereas, if the viewer leaves the viewable scope (Step 718), the automatic angle-adjustable display device will detect the position of the viewer (Step 711) and perform the above steps again. Some of the above steps will be illustrated in more details as follows.

Figure 8:
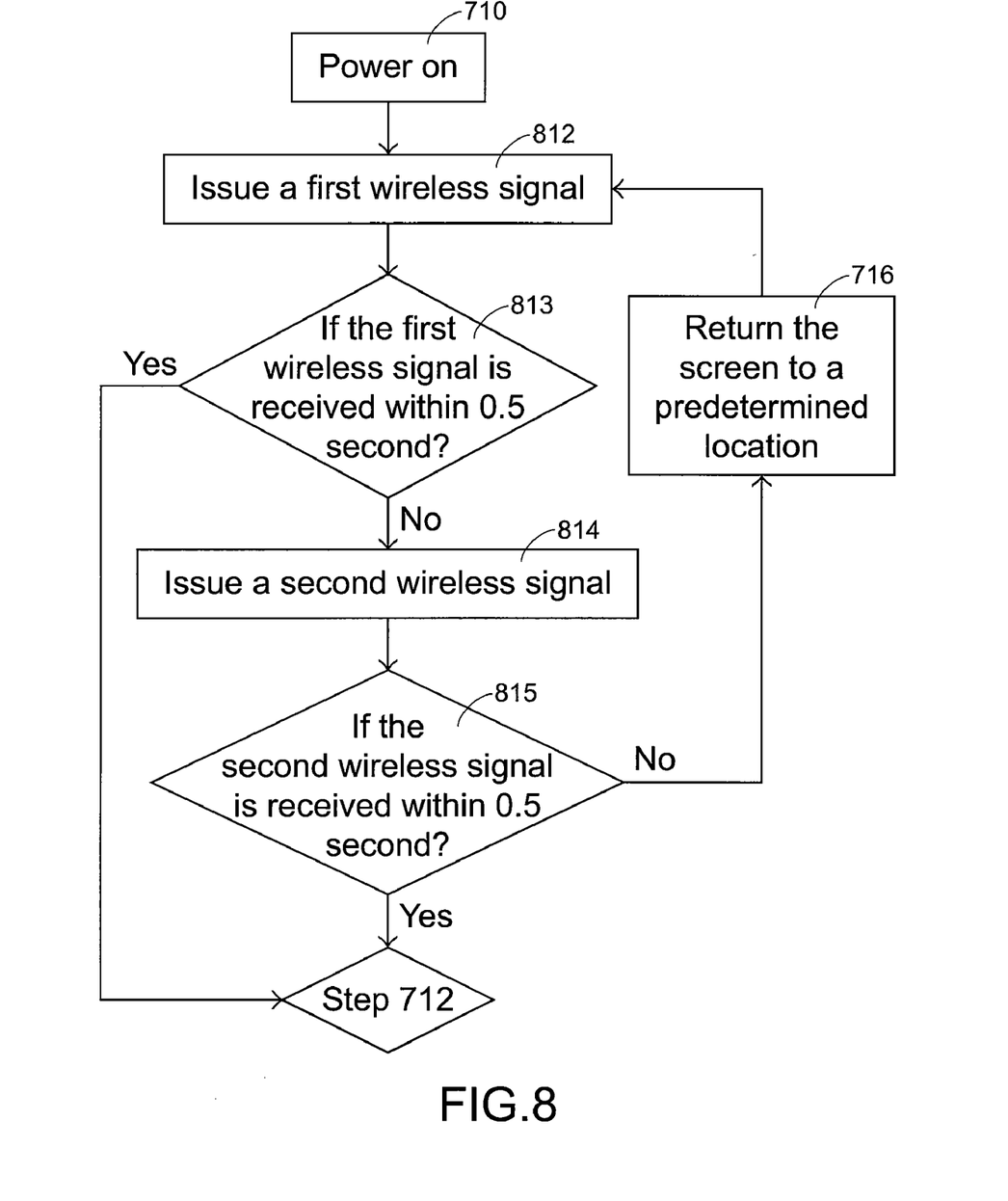
FIG. 8 is a flowchart illustrating an embodiment of performing the Step 711 in the process of operating the automatic angle-adjustable display device as shown in FIG. 7.

FIG. 8 is a flowchart illustrating an embodiment of performing the Step 711 in the process of operating the automatic angle-adjustable display device as shown in FIG. 7. After the automatic angle-adjustable display device is powered on by remote or manual control (Step 710), the Step 711 starts. Next, the control unit 416 triggers the first wireless transmitting and receiving sensor 411 to issue a first wireless signal at a first time spot (Step 812). As soon as the first wireless signal is issued, the first wireless transmitting and receiving sensor 411 waits for receiving the reflected first wireless signal in order to discriminate whether a viewer is located within the sensing range of the first wireless transmitting and receiving sensor 411. For example, if the reflected first wireless signal is received by the first wireless transmitting and receiving sensor 411 within a waiting time (e.g. 0.5 second) (Step 813), the Step 712 starts. Whereas, if no reflected first wireless signal is received by the first wireless transmitting and receiving sensor 411 within 0.5 second, it is meant that no viewer is located within the sensing range of the first wireless signal. Then, the control unit 416 triggers the second wireless transmitting and receiving sensor 412 to issue a second wireless signal at a second time spot (Step 814). As soon as the second wireless signal is issued, the second wireless transmitting and receiving sensor 412 waits for receiving the reflected second wireless signal in order to discriminate whether a viewer is located within the sensing range of the second wireless transmitting and receiving sensor 412. For example, if the reflected second wireless signal is received by the second wireless transmitting and receiving sensor 412 within 0.5 second (Step 815), the Step 712 starts. Whereas, if no reflected second wireless signal is received by the second wireless transmitting and receiving sensor 412 within 0.5 second, it is meant that no viewer is located within the sensing range of the second wireless signal. Meanwhile, the driving member 417 drives the angle adjustment mechanism 414 to return the screen 415 to a predetermined position in response to horizontal and vertical control signals issued by the control unit 416 (Step 716).

Figure 9:
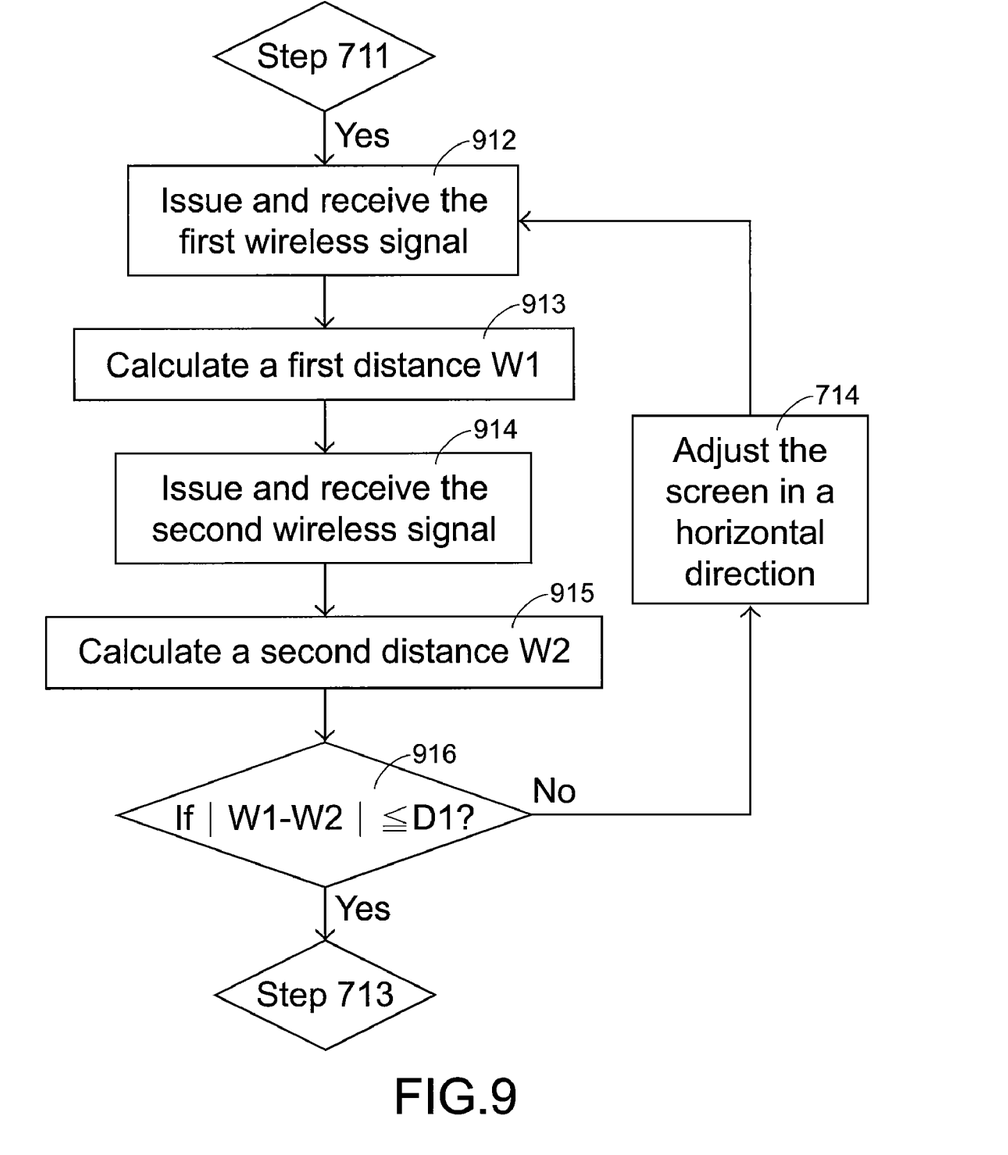
FIG. 9 is a flowchart illustrating an embodiment of performing the Step 712 in the process of operating the automatic angle-adjustable display device as shown in FIG. 7.

FIG. 9 is a flowchart illustrating an embodiment of performing the Step 712 in the process of operating the automatic angle-adjustable display device as shown in FIG. 7. After the Step 711, the control unit 416 triggers the first wireless transmitting and receiving sensor 411 to issue the first wireless signal at a first time spot and the first wireless signal is received at a fourth time spot (Step 912). Next, the control unit 416 calculates a first distance W1 between the viewer and the first position of the screen 415 according to the first time spot and the fourth time spot (Step 913). Next, the control unit 416 triggers the second wireless transmitting and receiving sensor 412 to issue the second wireless signal at a second time spot and the first wireless signal is received at a fifth time spot (Step 914). Next, the control unit 416 calculates a second distance W2 between the viewer and the second position of the screen 415 according to the second time spot and the fifth time spot (Step 915). Next, the control unit 416 determines if a first distance difference between the first distance W1 and the second distance W2 is within a first predetermined range D1 (Step 916). If the absolute value of the first distance difference is within the first predetermined range D1, i.e. |W1−W2|≧D1, the Step 712 is done and Step 713 starts.

On the other hand, if |W1−W2|≧D1, a horizontal control signal is issued by the control unit 416. In response to the horizontal control signal, the driving member 417 drives the angle adjustment mechanism 414 to adjust the screen 415 in a horizontal direction (Step 714). Until the screen 415 is adjusted such that |W1−W2|≦D1, the Step 712 is done. Ideally, the first predetermined range D1 is equal to zero, and thus the mathematical relation |W1−W2|≦0 indicates that the first distance W1 is equal to the second distance W2. That is, when the first predetermined range D1 is equal to zero, the distance between the first wireless transmitting and receiving sensor 411 at the first position of the screen 415 and the viewer is equal to the distance between the second wireless transmitting and receiving sensor 412 at the second position of the screen 415. Under a low operating frequency, the first predetermined range D1 is greater than zero, for example 100 mm. When the first predetermined range D1 is equal to 100 mm, the first distance W1 between the viewer and the first position of the screen 415 is not equal to the second distance W2 between the viewer and the second position of the screen 415 but the difference between W1 and W2 is acceptable.

Figure 10:
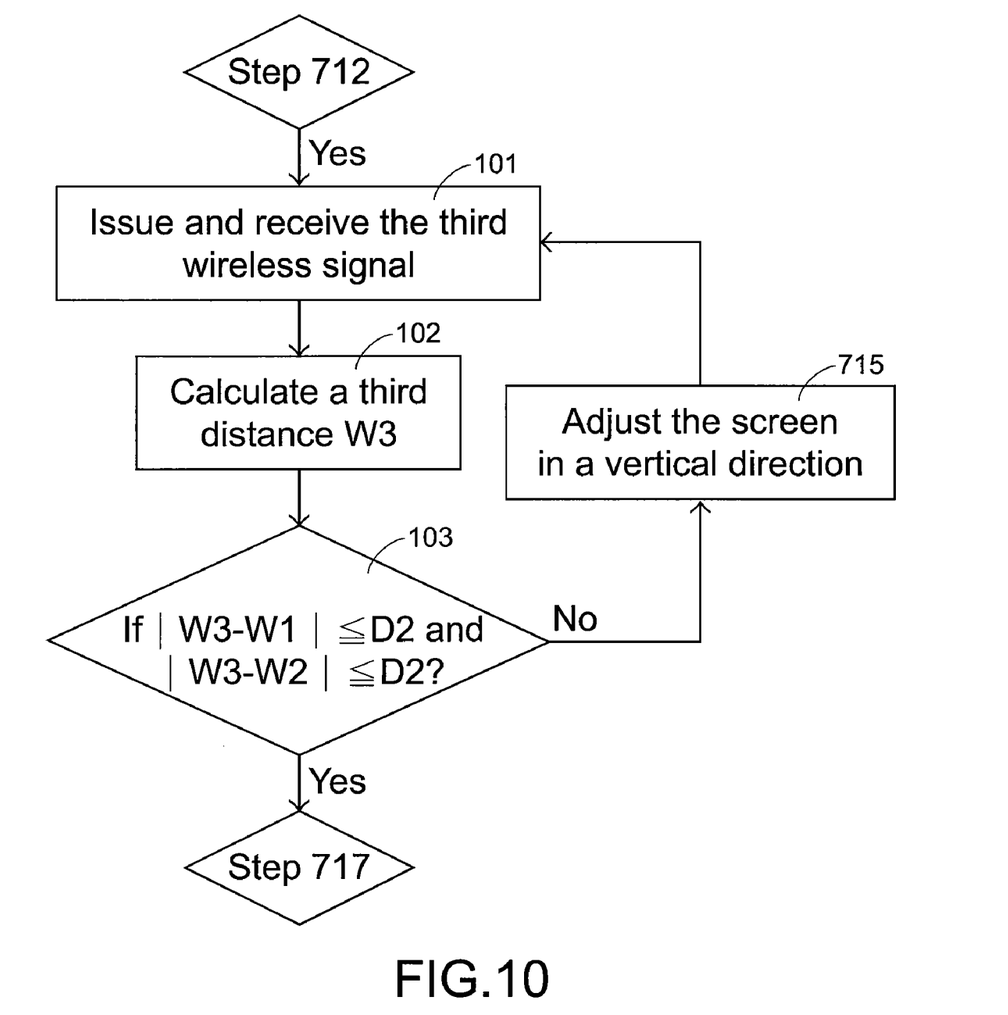
FIG. 10 is a flowchart illustrating an embodiment of performing the Step 713 in the process of operating the automatic angle-adjustable display device as shown in FIG. 7.

FIG. 10 is a flowchart illustrating an embodiment of performing the Step 713 in the process of operating the automatic angle-adjustable display device as shown in FIG. 7. After the Step 712, the control unit 416 triggers the third wireless transmitting and receiving sensor 413 to issue the third wireless signal at a third time spot and the third wireless signal is received at a sixth time spot (Step 101). Next, the control unit 416 calculates a third distance W3 between the viewer and the third position of the screen 415 according to the third time spot and the sixth time spot (Step 102). Next, the control unit 416 discriminates whether a second distance difference between the third distance W3 and the first distance W1 and a third distance difference between the third distance W3 and the second distance W2 are within a second predetermined range D2 (Step 103). If the absolute values of the first and second distance differences are within the second predetermined range D2, i.e. |W3−W1|≦D2 and |W3−W2|≦D2, the Step 713 is done. If |W3−W1|≦D2 or |W3−W2|≧D2, a vertical control signal is issued by the control unit 416. In response to the vertical control signal, the driving member 417 drives the angle adjustment mechanism 414 to adjust the screen 415 in a vertical direction (Step 715). Until the screen 415 is adjusted such that |W3−W1|≦D2 and |W3−W2|≦D2, the Step 717 starts. Ideally, the second predetermined range D2 is equal to zero, and thus the mathematical relations |W3−W1|≦D2 and |W3−W2|≦D2 indicate that the third distance W3 is equal to the first distance W1 and the second distance W2. That is, when the second predetermined range D2 is equal to zero, the distance between the third wireless transmitting and receiving sensor 413 at the third position of the screen 415 and the viewer, the distance between the first wireless transmitting and receiving sensor 411 at the first position of the screen 415 and the viewer, and the distance between the second wireless transmitting and receiving sensor 412 at the second position of the screen 415 are identical. Under a low operating frequency, the second predetermined range D2 is greater than zero, for example 100 mm. When the second predetermined range D2 is equal to 100 mm, the first distance W1, the second distance W2 and the third distance W3 are not identical but the differences between each two of W1, W2 and W3 are acceptable.

After the screen of the automatic angle-adjustable display device is adjusted to a proper position, a viewable scope is defined (Step 717). When the viewer moves within the viewable scope, the automatic angle-adjustable display device needs not to perform the above angle adjusting procedures. Whereas, if the viewer leaves the viewable scope (Step 718), the automatic angle-adjustable display device will detect the position of the viewer. In accordance with the present invention, a mathematical relations $H^2+X2^2 \geq X1^2$ and $H1^2+Z2^2 \geq Z1^2$ are used to discriminated whether the viewer is still within the viewable scope, which will be described later.

Figure 11A:
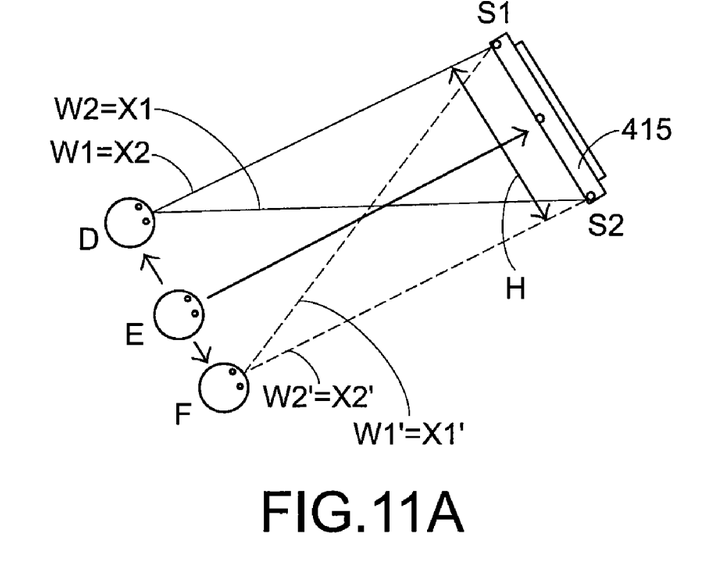
FIG. 11A is a schematic view illustrating an embodiment of discriminating whether the viewer is within the viewable scope of the automatic angle-adjustable display device according to the present invention.

FIG. 11A is a schematic view illustrating an embodiment of discriminating whether the viewer is within the viewable scope of the automatic angle-adjustable display device according to the present invention. As shown in FIG. 11A, the first wireless transmitting and receiving sensor 411 is located at the first position S1 of the screen 415 and the second wireless transmitting and receiving sensor 412 is located at the second position S2 of the screen 415. When the viewer is located at the position E, the viewer is directly in front of the middle of the screen 415. In a case that the viewer is moved leftwards from the position E to a position D, which is substantially in front of the first position S1 of the screen 415, it is necessary to check whether the mathematical relation $H^2+X2^2 \geq X1^2$ is satisfied. In this mathematical relation, X1 and X2 respectively indicate the longer and shorter distances of the wireless transmitting and receiving sensors with respect to the viewer. In addition, H is the distance between the first position S1 and the second position S2 of the screen 415, which is substantially equal to the width of the screen 415. When the viewer is located in the position D, W1=X2 and W2=X1. Assuming that W1=46 cm=X2, W2=47 cm=X1 and H=20 cm, $20^2+46^2 \geq 47^2$ and thus the mathematical relation $H^2+X2^2 \geq X1^2$ is satisfied. Under this circumstance, it is discriminated that the viewer is still within the viewable scope and thus no control signal is issued from the control unit 416 to control the driving member 417 to drive the angle adjustment mechanism 414. In another case that the viewer is moved rightwards from the position E to a position F, which is substantially in front of the second position S2 of the screen 415, it is also necessary to check whether the mathematical relation $H^2+X2'^2 \geq X1'^2$ is satisfied. In this mathematical relation, X1' and X2' respectively indicate the longer and shorter distances of the wireless transmitting and receiving sensors with respect to the viewer and H is the distance between the first position S1 and the second position S2 of the screen 415. Assuming that W1'=55 cm=X1', W2'=50 cm=X2' and H=20 cm, $20^2+50^2 \leq 55^2$ and thus the mathematical relation $H^2+X2'^2 \geq X1'^2$ is not satisfied. Under this circumstance, it is discriminated that the viewer is no longer within the viewable scope and the control unit 416 will detect the position of the viewer again (Step 711).

Figure 11B:
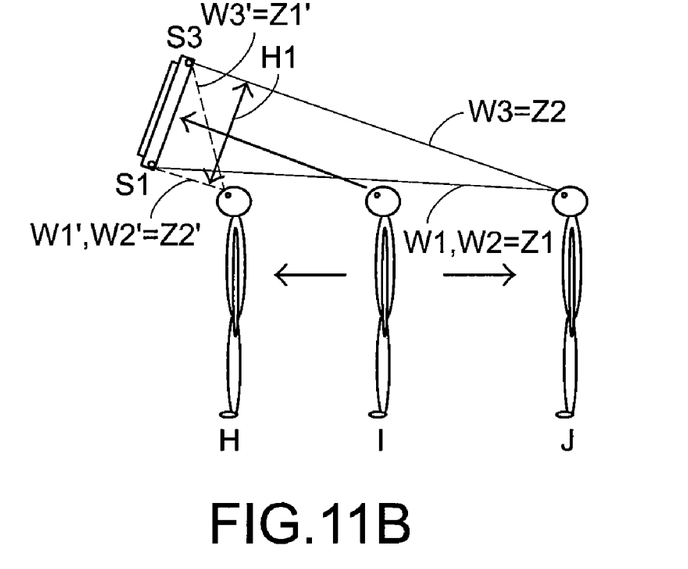
FIG. 11B is a schematic view illustrating another embodiment of discriminating whether the viewer is within the viewable scope of the automatic angle-adjustable display device according to the present invention.

FIG. 11B is a schematic view illustrating another embodiment of discriminating whether the viewer is within the viewable scope of the automatic angle-adjustable display device according to the present invention. As shown in FIG. 11B, the first wireless transmitting and receiving sensor 411 is located at the first position S1 of the screen 415, the second wireless transmitting and receiving sensor 412 is located at the second position S2 of the screen 415 and the third wireless transmitting and receiving sensor 413 is located at the third position S3 of the screen 415. When the viewer is located at the position I, the viewer is directly in front of the middle of the screen 415. In a case that the viewer is moved backwardly from the position I to a position J, it is necessary to check whether the mathematical relation $H1^2+Z2^2 \geq Z1^2$ is satisfied. In this mathematical relation, Z1 and Z2 respectively indicate the longer and shorter distances of the wireless transmitting and receiving sensors with respect to the viewer. In addition, H1 is the distance between the third position S3 and the first position S1 (or the second position S2) of the screen 415, which is substantially equal to the height of the screen 415. When the viewer is located in the position J, W1, W2=Z1 and W3=Z2. Assuming that W1, W2=48 cm=Z1, W3=46 cm=Z2 and H1=15 cm, $15^2+46^2 \geq 48^2$ and thus the mathematical relation $H1^2+Z2^2 \geq Z1^2$ is satisfied. Under this circumstance, it is discriminated that the viewer is still within the viewable scope and thus no control signal is issued from the control unit 416 to control the driving member 417 to drive the angle adjustment mechanism 414. In another case that the viewer is moved forwardly from the position I to a position H, it is also necessary to check whether the mathematical relation $H1'^2 + Z2'^2 \geq Z1'^2$ is satisfied. In this mathematical relation, Z1' and Z2' respectively indicate the longer and shorter distances of the wireless transmitting and receiving sensors with respect to the viewer and H1 is the distance between the third position S3 and the first position S1 (or the second position S2) of the screen 415. Assuming that W1', W2'=15 cm=Z2', W3'=25 cm=Z1' and H1=15 cm, $15^2 + 15^2 = 25^2$ and thus the mathematical relation $H1^2 + Z2^2 \geq Z1^2$ is not satisfied. Under this circumstance, it is discriminated that the viewer is no longer within the viewable scope and the control unit 416 will detect the position of the viewer again (Step 711).

From the above description, the automatic angle-adjustable display device of the embodiments of the present invention may automatically monitor the viewer's position by detecting the wireless signals emitted from the wireless transmitting and receiving sensors and reflected from the viewer. According to the wireless signals, the angle of the screen is automatically adjusted and thus desired viewing angle of the screen with respect to the viewer is achieved. Under this circumstance, the images on the screen are viewed without distortion. In the above embodiments, the first, second and third wireless transmitting and receiving sensors are ultrasonic transmitting and receiving sensors, microwave sensors, radio detectors or laser scanners. Similarly, in case that an object is located within the sensing ranges of these detectors, the control unit triggers these wireless transmitting and receiving sensors to emit wireless signals at certain time spots. After the reflected wireless signals are received, corresponding notification signals are issued to the control unit 416 for further processing.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An automatic angle-adjustable display device for showing images to be viewed by a viewer, the automatic angle-adjustable display device comprising:
   a screen showing the images;
   a first wireless transmitting and receiving sensor located at a first position of the screen for emitting a first wireless signal and receiving the first wireless signal reflected from the viewer;
   a second wireless transmitting and receiving sensor located at a second position of the screen for emitting a second wireless signal and receiving the second wireless signal reflected from the viewer;
   a third wireless transmitting and receiving sensor located at a third position of the screen for emitting a third wireless signal and receiving the third wireless signal reflected from the viewer;
   an angle adjustment mechanism connected to the screen for adjusting a viewing angle of the screen with respect to the viewer in response to a control signal; and
   a control unit communicated with the first wireless transmitting and receiving sensor, the second wireless transmitting and receiving sensor, the third wireless transmitting and receiving sensor and the angle adjustment mechanism for triggering the first, second and third wireless transmitting and receiving sensors to respectively emit the first, second and third wireless signals, calculating a first distance between the first position of the screen and the viewer, a second distance between the second position of the screen and the viewer and a third distance between the third position of the screen and the viewer according to the reflected first, second and third wireless signals, and calculating a first distance difference between the first distance and the second distance, a second distance difference between the third distance and the first distance and a third distance difference between the third distance and the second distance, thereby generating the control signal according to the first, second and third distance differences, wherein in response to the control signal, the angle adjustment mechanism is driven to adjust the viewing angle of the screen with respect to the viewer such that the first distance difference lies within a first predetermined range and the second and third distance differences lie within a second predetermined range.

2. The automatic angle-adjustable display device according to claim 1 wherein the control unit comprises a microprocessor or a micro-controller, and the screen comprises a liquid crystal display screen or a plasma display screen.

3. The automatic angle-adjustable display device according to claim 1 wherein the control unit periodically triggers the first, second and third wireless transmitting and receiving sensors to respectively emit the first, second and third wireless signals, so that the control unit discriminates whether the viewer is located within the sensing ranges of the first, second and third wireless transmitting and receiving sensors according to the first, second and third wireless signals, wherein the first, second and third distances of the first, second and third wireless transmitting and receiving sensors with respect to the viewer are respectively calculated according to the time spots when the first, second and third wireless signals are emitted by the first, second and third wireless transmitting and receiving sensors and the time spots when the first, second and third wireless signals reflected by the viewer are received by the first, second and third wireless transmitting and receiving sensors.

4. The automatic angle-adjustable display device according to claim 1 wherein the control unit triggers the first, second and third wireless transmitting and receiving sensors to respectively emit the first, second and third wireless signals at first, second and third time spots, and detects the reflected first, second and third wireless signals at fourth, fifth and sixth time spots, wherein the control unit calculates the first distance according to the first time spot and the fourth time spot, the second distance according to the second time spot and the fifth time spot, and the third distance according to the third time spot and the sixth time spot.

5. The automatic angle-adjustable display device according to claim 1 wherein the angle adjustment mechanism comprises:
a horizontal rotation servo motor activated to rotate in response to the control signal;
a suspended member connected to the horizontal rotation servo motor and driven by the horizontal rotation servo motor to be rotated in a horizontal direction; and
a vertical rotation servo motor connected to the suspended member and the screen to drive the screen to rotate in a vertical direction in response to the control signal.

6. The automatic angle-adjustable display device according to claim 1 wherein the first, second and third wireless transmitting and receiving sensors comprise ultrasonic transmitting and receiving sensors, microwave sensors, radio detectors or laser scanners.

7. The automatic angle-adjustable display device according to claim 1 wherein the first, second and third distance differences are expressed as absolute values or proportions, and the first and second predetermined ranges are equal to or greater than zero.

8. The automatic angle-adjustable display device according to claim 1 wherein the angle adjustment mechanism sends a positioning signal back to the control unit after a desired viewing angle of the screen is adjusted by the angle adjustment mechanism, wherein the positioning signal indicates the current position of the screen, and the screen is adjusted to a predetermined position according to the positioning signal if no viewer is located within the sensing ranges of the first, second and third wireless transmitting and receiving sensors.

9. The automatic angle-adjustable display device according to claim 1 wherein the control unit further checks whether the first, second and third distances match a specified mathematical relation so as to discriminate whether the viewer is located within a viewable scope, wherein the control units detects the position of the viewer again if the viewer is not located within the viewable scope.

10. The automatic angle-adjustable display device according to claim 1 wherein the control unit issues a horizontal control signal to the angle adjustment mechanism if the first distance difference is beyond the first predetermined range, and in response to the horizontal control signal, the angle adjustment mechanism is driven to horizontally rotate the screen until the first distance difference is within the first predetermined range.

11. The automatic angle-adjustable display device according to claim 1 wherein the control unit issues a vertical control signal to the angle adjustment mechanism if the second and third distance differences are beyond the second predetermined range, and in response to the vertical control signal, the angle adjustment mechanism is driven to vertically rotate the screen until the second and third distance differences are within the second predetermined range.

12. An angle-adjustable method for use with a screen of a display device, the method comprising steps of:
measuring a first distance between a first position of the screen and a viewer;
measuring a second distance between a second position of the screen and the viewer;
measuring a third distance between a third position of the screen and the viewer; and
calculating a first distance difference between the first distance and the second distance, a second distance difference between the third distance and the first distance and a third distance difference between the third distance and the second distance, and adjusting the viewing angle of the screen with respect to the viewer according to the first, second and third distance differences, so that the first distance difference lies within a first predetermined range and the second and third distance differences lie within a second predetermined range.

13. The angle-adjustable method according to claim 12 the steps of measuring the first, second and third distances comprising:
emitting the first wireless signal at a first time spot and receiving the reflected first wireless signal at a fourth time spot;
emitting the second wireless signal at a second time spot and receiving the reflected second wireless signal at a fifth time spot;
emitting the third wireless signal at a third time spot and receiving the reflected third wireless signal at a sixth time spot; and
calculating the first distance according to the first time spot and the fourth time spot, calculating the second distance according to the second time spot and the fifth time spot, and calculating the third distance according to the third time spot and the sixth time spot.

14. The angle-adjustable method according to claim 12 wherein the first, second and third distance differences are expressed as absolute values or proportions, and the first and second predetermined ranges are equal to or greater than zero.

15. The angle-adjustable method according to claim 12 wherein if the first distance difference is beyond the first predetermined range, the angle-adjustable method further comprises a step of horizontally rotating the screen until the first distance difference is within the first predetermined range.

16. The angle-adjustable method according to claim 12 wherein if the second and third distance differences are beyond the second predetermined range, the angle-adjustable method further comprises a step of vertically rotating the screen until the second and third distance differences are within the second predetermined range.

17. The angle-adjustable method according to claim 12 further comprising a step of periodically emitting the first, second and third wireless signals and discriminating that the viewer is locating within the sensing range of the display device if the first, second and third wireless signals are reflected back by the viewer, wherein the first, second and third distances are calculated according to the time spots when the first, second and third wireless signals are emitted and the time spots when the first, second and third wireless signals reflected by the viewer are received.

18. The angle-adjustable method according to claim 12 further comprising a step of checking whether the first, second and third distances match a specified mathematical relation so as to discriminate whether the viewer is located within a viewable scope, wherein the display device detects the position of the viewer again if the viewer is not located within the viewable scope.

* * * * *